United States Patent
Obermeier et al.

Patent Number: 5,559,890
Date of Patent: Sep. 24, 1996

[54] CRYPTO EQUIPMENT

[75] Inventors: Siegfried Obermeier, Unterschleissheim; Peter Bergner, Obeschleissheim, both of Germany

[73] Assignee: Siemens Aktiengesellschaft, Munich, Germany

[21] Appl. No.: 386,802

[22] Filed: Jul. 27, 1989

[30] Foreign Application Priority Data

Jul. 29, 1988 [DE] Germany .......................... 38 25 880.3

[51] Int. Cl.⁶ ......................................................... H04L 9/00
[52] U.S. Cl. ................................................. 380/48; 380/49
[58] Field of Search ................................... 380/49, 48, 42

[56] References Cited

U.S. PATENT DOCUMENTS

| | | | |
|---|---|---|---|
| 3,886,313 | 5/1975 | Branscome et al. | 380/49 |
| 3,970,791 | 7/1976 | Johnson | 380/49 |
| 4,365,110 | 12/1982 | Lee et al. | 380/49 |

FOREIGN PATENT DOCUMENTS

| | | | |
|---|---|---|---|
| 2920589 | 8/1980 | Germany | H04L 9/02 |
| 3501674 | 7/1986 | Germany | H04L 5/22 |
| 1120975 | 7/1968 | United Kingdom | H04L 3/00 |
| 1495426 | 12/1977 | United Kingdom | H04J 3/00 |

*Primary Examiner*—David C. Cain
*Attorney, Agent, or Firm*—Hill, Steadman & Simpson

[57] ABSTRACT

For the transmission of information, such as voice and data that it is necessary to keep secret, it is standard to encode the information at the transmitting side in the digital level and to in turn decode the encoded information at the receiving side after they have been transmitted. With respect to an economical exploitation of the transmission links, it is standard to combine several signals, or respectively, a plurality of signals on the basis of multiplexing methods. Such digital signal hierarchies are standardized according to the CCITT and, given higher hierarchy levels lead to bit rates of more than 100 Mbit. A solution to the extremely high expense for crypto equipment comprising integrated modules operating at such bit rates, multiplexing technology is employed which makes use of a plurality of encoders and a plurality of decoders that have low power consumption and that are composed of integrated modules constructed in accordance with CMOS technology.

8 Claims, 2 Drawing Sheets

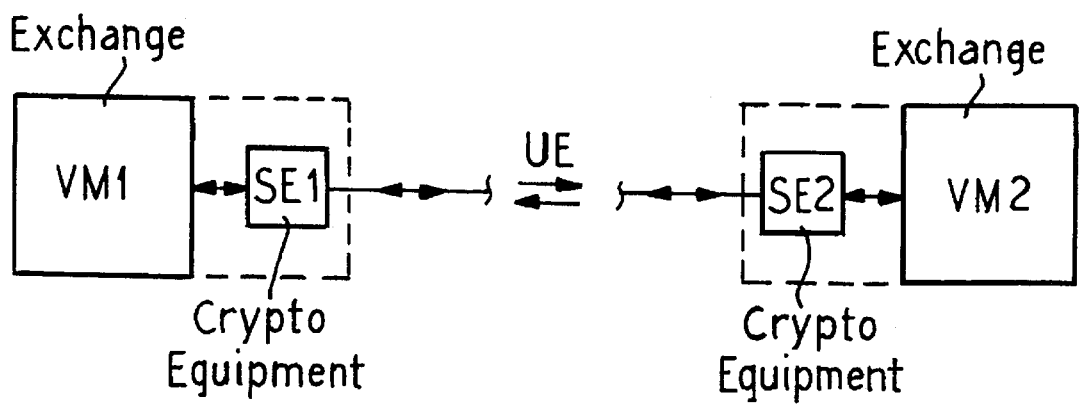
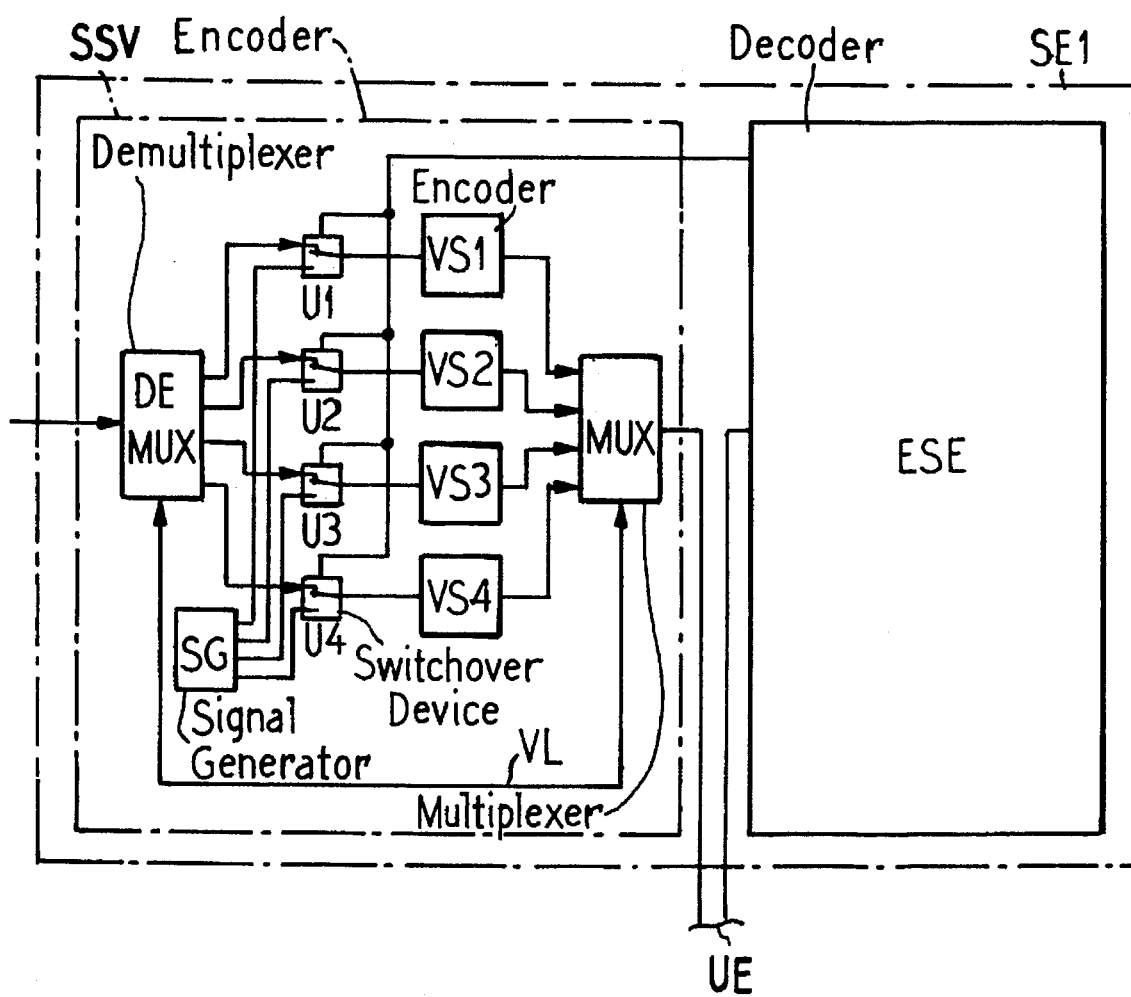

CRYPTO EQUIPMENT

BACKGROUND OF THE INVENTION

1. Field of the Invention

The present invention relates to crypto equipment composed of an encoder at the transmitting side and a decoder at the receiving side, each respectively provided with a synchronization device for bit-by-bit encoding at the transmitting side and bit-by-bit decoding at the receiving side with respect to a bit stream having a high bit sequence frequency and representing a binary signal.

2. Description of the Prior Art

Crypto equipment of the type set forth above are disclosed, for example, in DE 29 20 589 B1. They serve the purpose of keeping information, for example, voice or data, that are to be transmitted secret. The bit stream representing the digital signal to be encoded can have a relatively high bit sequence rate when a sum signal transmission channel between two transmitting-receiving stations that represents exchanges is thereby involved.

As shown, for example, by the Jahrbuch der Deutschen Bundespost, Vol. 35, 1984, Verlag fuer Wissenschaft und Leben, Georg Heidecker, Bad Windsheim, pp. 334 and 335, several signals or, respectively, a plurality of signals are combined by multiplexing methods for the economical exploitation of transmission links, and what is referred to as a digital signal hierarchy is thus formed. In the fourth hierarchy level of the hierarchy structure on the 30-channel basic system, the bit stream of the first hierarchy level already exhibits a bit rate of 2048 Mbit and the fourth hierarchy level exhibits a bit rate of 139, 246 Mbit. In order to obtain optimally-small dimensions and an optimally-low power consumption of the required circuits, particularly for the utilization of such crypto equipment in mobile broadcast systems, integrated circuits in complementary metal-oxide-semiconductor (CMOS) technology are utilized. As has been shown, the operating speed of such integrated circuits constructed in CMOS technology cannot be arbitrarily increased. In order to encode, for example, a crypto equipment for encoding a digital sum signal of the fourth hierarchy level, the circuit required for this purpose can no longer be constructed in CMOS technology. On the contrary, one must switch to other technologies whose circuits exhibit a considerably higher power consumption. This is a considerable disadvantage given the utilization of such crypto equipment in the mobile broadcast area, since mobile broadcast equipment must be capable of operating independently of the mains voltage and the energy sources required for this purpose are to be kept sufficiently small for reasons of weight and dimensions.

SUMMARY OF THE INVENTION

Proceeding from a crypto equipment of the type generally set forth above, the object of the present invention is to provide a circuit design that, given construction with integrated modules in CMOS technology, allows the encoding of binary signals with bit rates on the order of magnitude of 100 MHz and above.

The above object is achieved in crypto equipment, composed of an encoder at the transmitting side and a decoder at the receiving side, each respectively provided with a synchronous device for bit-by-bit encoding at the transmitting side and bit-by-bit decoding at the receiving side of a bit stream that has a high bit rate and represents a binary signal, which is characterized in that the encoder of the transmitting side comprises n encoders and decoder at the receiving side comprises n decoders corresponding to the n encoders, in that, furthermore, the inputs sides of the n encoders and n decoders each have a demultiplexer that divides the bit stream towards them into n bit streams assigned thereto and the output sides thereof each have a multiplier that again combines the encoded, or respectively, decoded bit streams to form the encoded or, respectively, decoded bit stream assigned thereto, and that the synchronization device for the encoder of the transmitting side and for the decoder of the receiving side is respectively designed for an individual synchronization of the n encoders or, respectively, n decoders assigned thereto.

The present invention is based on the critical perception that the encoding of such a bit stream, having an extremely high bit rate, can also be accomplished in that a parallel encoding of bit streams is utilized upon application of multiplexing technology, in particular such that no additional signals have to be introduced into the bit stream to be transmitted, such that no additional requirement for bandwidth arises for the required synchronization for the individual decoders and individual decoders being utilized, including their demultiplexer at the input side and their multiplexer at the output side.

A particular feature of the invention is characterized in that the synchronization operation between the demultiplexer at the input side and the multiplexer at the output side of the encoder of the transmitting side or, respectively, of the decoder at the receiving side is ensured by mutual coupling of their control.

Another feature of the invention is particularly characterized in that the synchronous operation between the demultiplexer at the input side and the multiplexer at the output side of the encoder of the transmitting side and the decoder of the receiving side is undertaken via the synchronization device.

Another feature of the invention is particularly characterized in that a transfer device is arranged in each of the connecting paths between the demultiplexer of the individual encoders of the encoder of the transmitting side, the inputs of the individual encoders being switchable with the assistance of the transfer device from the outputs of the demultiplexer assigned thereto to a signal generator which outputs a synchronization request signal, being switchable therewith for the implementation of a synchronous event.

Another feature of the invention is particularly characterized in that the synchronization request signal output by the signal generator is identical for all individual encoders of the encoder of the transmitting side and, for the implementation of a synchronization event, the synchronization is first effected by switching the input of the first of the n encoders onto the output of the signal generator for this signal path across the remote transmitting-receiving station and, subsequently, the synchronization is likewise accomplished in the same manner via a switching of the inputs of the remaining n-1 individual encoders onto the output of the signal generator for the signal paths representing the individual decoders and the synchronization event is thus terminated.

Another feature of the invention is particularly characterized in that the signal generator outputs a different synchronization request signal to each of the n individual encoders of the encoder of the transmitting side, and in that, for the implementation of the synchronization event, the synchronization is simultaneously produced by simultaneous switching of the n inputs of the n individual encoders onto the n outputs of the signal generator assigned thereto for all n signal paths representing the encoders across the remote transmitting-receiving station and the synchronization event is thus terminated.

Another feature of the invention is particularly characterized in that each of the n-individual encoders of the encoder of the transmitting side, as well as each of the n individual decoders of the decoder of the receiving side is constructed as an integrated module in CMOS technology.

Another feature is particularly characterized in that, for encoding a bit stream having a bit rate of 139,264 Mbit, the plurality of n of, first, the individual encoders of the encoder of the transmitting side and, secondly, of the individual decoders of the decoder of the receiving side is four, and in that each individual encoder or, respectively, individual decoder is designed for processing a bit rate of 34,816 Mbit.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a transmission link for the transmission of a binary signal in the form of an encoded bit stream having a high bit rate;

FIG. 4 is a schematic representation of a further exemplary embodiment of an encoder at the transmitting side of a crypto equipment four individual encoders.

DESCRIPTION OF THE PREFERRED EMBODIMENTS

Referring to FIG. 1, a schematic illustration is provided of a transmission link UE that can connect two exchanges VM1 and VM2 to one another. It is here assumed that the transmission link UE is designed for the transmission of the binary sum signal having a bit rate of 139,264 Mbit. This corresponds to the fourth digital signal hierarchy level of a 30-channel basic system according to CCITT standards. The bit stream representing this bit sum signal is to be transmitted between the two exchanges in encoded form. To this end, the exchange VM1 comprises a crypto equipment SE1 and the exchange VM2 comprises a crypto equipment SE2. The crypto equipment have the job of encoding the binary signal proceeding onto the transmission link UE and of decoding the binary signal incoming from the transmission link UE. A broken line respectively indicates that the crypto equipment SE1 is a component part of the exchange VM1 and the crypto equipment SE2 is a component part of the exchange VM2.

Figure 2:
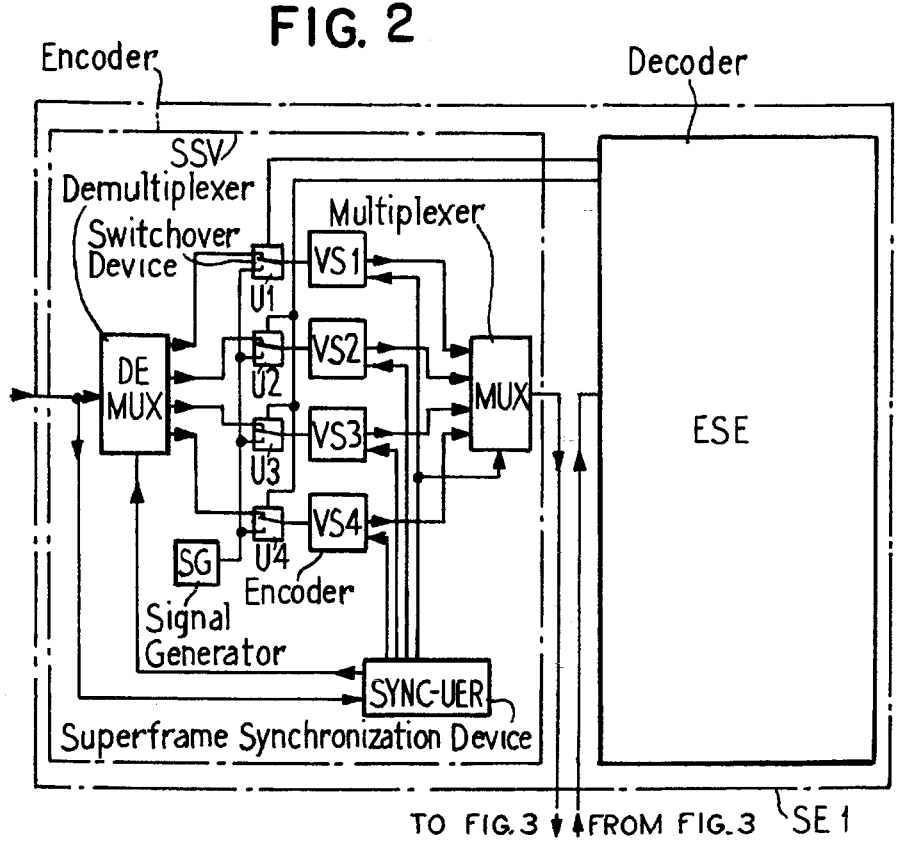
FIG. 2 is a schematic representation of a first preferred embodiment of the encoder of the transmitting side of the transmission link of FIG. 1 for four individual encoders.
Figure 3:
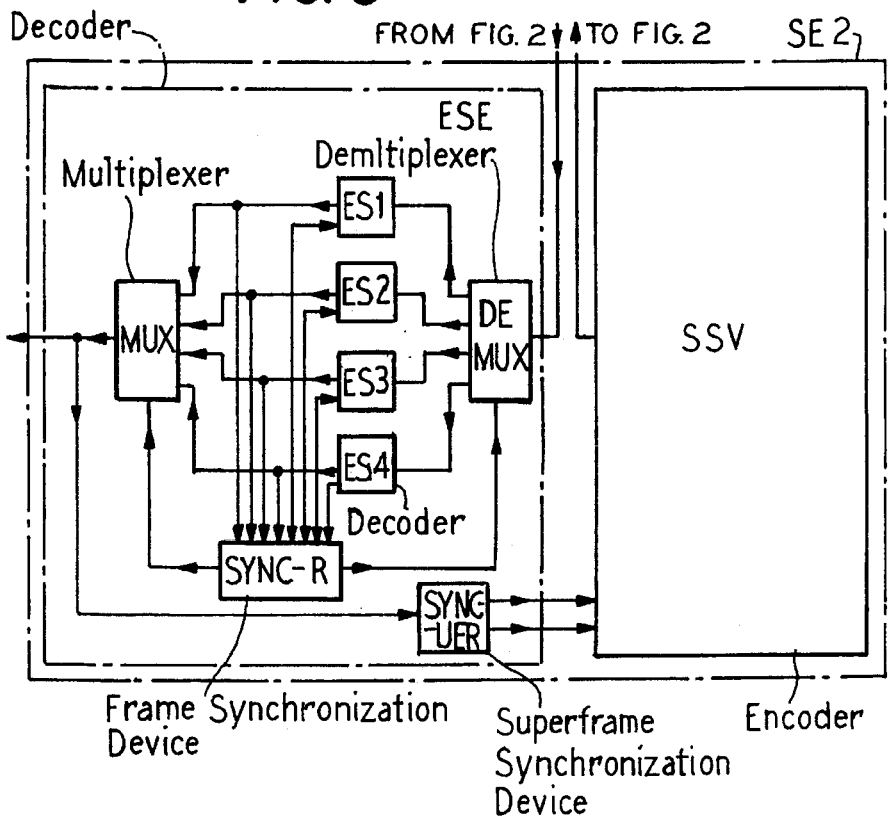
FIG. 3 is a schematic representation of a first preferred embodiment of a decoder of the receiving side of the transmission link of FIG. 1 for four individual decoders.

Further circuit details of the crypto equipment SE1 and SE2 of FIG. 1 are shown in FIGS. 2 and 3. The crypto equipment SE1 and SE2 that are constructed completely identically are each respectively composed of an encoder SSV at the transmitting side and a decoder ESE at the receiving side. For reasons of simplicity, FIG. 2 only shows the encoder SSV of the transmitting side and FIG. 3 only shows the decoder ESE of the receiving side in terms of individual circuit blocks.

At its input side, the encoder SSV of the transmitting side shown in FIG. 2 comprises a demultiplexer DEMUX that divides the bit stream of the input side into four identical bit streams and supplies these four bit streams to four encoders VS1, VS2, VS3 and VS4 via a respective switch-over device U1, U2, U3 and U4. The bit streams encoded in the encoders are subsequently recombined in the multiplexer MUX to form a bit stream that is now encoded and are transmitted via the transmission link to the remote exchange that is to be addressed as the transmitting-receiving station.

The switch-over devices U1, U2, U3 and U4 at the input side of the individual encoders VS1, VS2, VS3 and VS4 provide the possibility of connecting the inputs of the individual encoders from the outputs of the demultiplexer DMUX pertaining thereto to the output of the signal generator that belongs to the synchronization device and generates a synchronization request signal. The encoder SSV of the transmitting side further comprises a superframe synchronization device SYNC-UER that likewise belongs to the synchronization device, to which the bit stream at the input side in communication with the synchronization inputs of, first of all, the demultiplexer DEMUX and of the multiplexer MUX and, secondly, with the individual encoders VS1, VS2, VS3 and VS4.

As a comparison of the decoder ESE of the receiving side that is likewise shown in FIG. 3 in terms of its circuit blocks with the encoder SSV of the transmitting side according to FIG. 2 shows, this has the same basic structure, with the difference that the four individual encoders VS1, VS2, VS3 and VS4 are replaced by four individual decoders ES1, ES2, ES3 and ES4 and further, that no switch-over devices are provided at the input side of these individual decoders.

The synchronization device of the decoder ESE at the receiving side of a crypto equipment SE1 or, respectively, SE2 is composed, first of all, of the superframe synchronization device SYNC-UER and, secondly, of a frame synchronization device SYNC-R, in the crypto equipment of the remote exchange, for example the exchange VM2, the superframe synchronization device SYNC-UER receives the incoming, encoded bit stream at its input side and initiates the encoder SSV of the transmitting side at the same location to output a synchronization request signal via control lines of the output side by way of an actuation of its switch-over device U1, U2, U3 and U4.

The frame synchronization device SYNC-R is connected via four lines to the respective outputs of the individual decoders ES1, ES2, ES4 and has its output side in communication with the synchronization inputs of, first of all, the demultiplexer DEMUX and the multiplexer MUX and, secondly, with the individual decoders ES1, ES2, ES3 and ES4.

It is here assumed, for explaining a synchronization event, that the event V2 to which the crypto equipment SE2 is assigned is the receiving transmitting-receiving station and the exchange VM1 to which the crypto equipment SE1 is assigned is the transmitting station.

When the superframe synchronization device SYNC-UER of the decoder ESE at the receiving side of the crypto equipment SE2 does not recognize the superframe in the incoming signal, i.e. when no synchronization is present, it initiates the transmitting-receiving station to broadcast a synchronization request signal. This occurs in such a manner that the superframe synchronization device SYNC-UER of the decoder ESE at the receiving side of the crypto equipment SE1 first connects the individual encoder VS1 of the encoder SSV at the transmitting side of this crypto equipment to the output of the signal generator SG via the switch-over device U1. After transmission via the transmission link UE, the synchronization request signal encoded in the encoder VS1 is decoded at the receiving transmitting-receiving station in one of the four individual decoders ES1, ES2, ES3 and ES4 and is recognized by the frame synchronization device SYNC-R. Depending on which of the four individual decoders outputs the decoded synchronization of request signals, the frame synchronization device SYNC-R initiates a synchronization of the individual encoder ES1 to such an effect that the decoded synchronization request signal appears at its output. At the same time, the demultiplexer DEMUX and the multiplexer MUX are also synchronized by the frame synchronization device SYNC-R. Following thereupon, the inputs of the individual encoders VS2, VS3 and VS4 of the encoder SSV at the transmitting side of the crypto equipment are simultaneously switched to the output of the synchronization generator SG via the superframe synchronization device SYNC-UER and, after transmission of the synchronization request signals encoded in the encoders VS2, VS3 and VS4, and after their reception at the receiving transmission-receiving station, the same are utilized for the synchronization of the encoders ES2, ES3 and ES4. Finally, the inputs of the encoders VS1, VS2, VS3 and VS4 of the encoder SSV at the transmitting side of the crypto equipment SE1 are again connected to the outputs of the demultiplexer DEMUX and pertaining thereto via the switch over devices U1, U2, U3 and U4 and, therefore, the synchronization event is terminated.

This type of synchronization makes it possible to avoid the transmission of special synchronization information in the bit stream to be transmitted. This situation is then lent special significance when it is required that the bit rate of the bit stream to be transmitted in encoded form via the transmission link UE is not modified due to encoding and, over and above this, the information itself is not modified by the omission of bits.

FIG. 4 is a circuit diagram of the crypto equipment SE1 corresponding to FIG. 2 for a modification of the synchronization of the crypto equipment. When each of the individual encoders VS1, VS2, VS3 and VS4 has its own synchronization signal assigned thereto by the signal generator SG, these synchronization request signals differing from one another, then it is possible to simultaneously synchronize all individual encoders of the transmitting side with all individual decoders of the receiving side. The superframe synchronization device SYNC-UER on the part of the encoder SSV of the transmitting side can thereby be eliminated. As the encoder SSV of the transmitting side according to FIG. 4 shows, the signal generator SG now comprises four outputs for the four inputs of the individual encoders. When a synchronization request signal is required, then the inputs of the four individual encoders are simultaneously connected to the four outputs of the signal generator SG via the transfer devices U1, U2, U3 and U4 and the synchronization of the crypto equipment of the remote transmitting-receiving station is accomplished in the manner already set forth. The mutual synchronizations of the demultiplexer DEMUX and of the multiplexer MUX are guaranteed here by mutual coupling of their control via the connecting line VL.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:
1. Crypto equipment constructed in accordance with CMOS technology, comprising:
an encoder device at a transmitting side and a decoder device at a receiving side for bit-by-bit encoding and decoding of a bit stream having a high bit rate representing a binary signal;
said encoder device comprising n encoders and said decoding device comprising n decoders;
a first multiplexer for receiving the bit stream connected to n encoders for dividing the bit stream into n bit streams;
a first multiplexer connected to said n encoders for combining the encoded bit streams for transmission;
a second demultiplexer for receiving the encoded bit stream, said second multiplexer connected to said n decoders and operated to divide the encoded bit stream into n encoder bit streams;
a second multiplexer connected to said n decoders for combining the n decoder bit streams; and
synchronization means at the transmitting and receiving sides connected to said n encoders and n decoders for individual synchronization thereof.
2. The crypto equipment of claim 1, comprising:
synchronization control means for controlling said first and second multiplexers and said first and second demultiplexers by mutual coupling.
3. The crypto equipment of claim 1, wherein:
said synchronization means comprises a first synchronization device connected to said first multiplexer and said first demultiplexer and a second synchronization device connected to said second multiplexer and said second demultiplexer.
4. The crypto equipment of claim 1, and further comprising:
n switch over devices between said first demultiplexer and said n decoders, respectively; and
a signal generator connected to each of said switch over devices for producing a synchronization request signal to implement a synchronization event.
5. The crypto equipment of claim 4, and further comprising:
means in said signal generator for producing identical synchronization request signals for all of said encoders; and
means in said decoder device connected to said switch over devices and operable to first switch over a first of said encoders to said signal generator and then switch over the remaining encoders to said signal generator to terminate the synchronization event.
6. The crypto equipment of claim 4, and further comprising:
means in said signal generator for producing different synchronization request signals for each of said encoders; and
means in said decoder device connected to said switch over devices for producing simultaneous switch over to the inputs of said n decoders to terminate the synchronization event.
7. The crypto equipment of claim 1, wherein:
each of said encoders and each of said decoders is a CMOS circuit module.
8. The crypto equipment of claim 1, wherein:
the bit stream has a 139,264 Mbit rate;
n is equal to four; and
each of said encoders and decoders operates at a bit rate of 34,816 Mbit.

\* \* \* \* \*